United States Patent [19]
Ishizuka

[11] Patent Number: 4,762,696
[45] Date of Patent: Aug. 9, 1988

[54] METHOD OF PURIFICATING TITANIUM TETRACHLORIDE

[76] Inventor: Hiroshi Ishizuka, 19-2, Ebara 6-chome, Tokyo, Japan

[21] Appl. No.: 48,491

[22] Filed: May 7, 1987

Related U.S. Application Data

[63] Continuation of Ser. No. 745,029, Jun. 17, 1985, abandoned.

[30] Foreign Application Priority Data

Jun. 30, 1984 [JP] Japan ................. 59-136036

[51] Int. Cl.$^4$ ............................................. C01G 23/02
[52] U.S. Cl. ....................................... 423/77; 423/73; 423/492; 423/612
[58] Field of Search ............... 423/492, 612, 611, 72, 423/73, 76, 77, 78, 80, 75, 69

[56] References Cited

U.S. PATENT DOCUMENTS

| 2,871,094 | 1/1959 | Tarsey et al. | 423/77 |
| 3,102,785 | 9/1963 | Bristow | 423/76 |
| 3,533,733 | 10/1970 | Clark et al. | 423/492 |
| 3,729,540 | 4/1973 | Brudz et al. | 423/76 |
| 3,871,874 | 3/1975 | Winter | 423/492 |
| 3,939,244 | 2/1976 | Piccolo et al. | 423/492 |
| 3,989,510 | 11/1976 | Othmer | 423/492 |
| 4,046,854 | 9/1977 | Dunderdale | 423/77 |
| 4,070,252 | 1/1978 | Bonsack | 423/69 |
| 4,202,866 | 5/1980 | Feng et al. | 423/492 |
| 4,244,935 | 1/1981 | Dell | 423/492 |
| 4,279,871 | 7/1981 | Bonsack | 423/492 |
| 4,329,322 | 5/1982 | Bonsack et al. | 423/77 |

Primary Examiner—Anthony McFarlane
Attorney, Agent, or Firm—Larson and Taylor

[57] ABSTRACT

A method of purificating titanium tetrachloride, comprising: heating a loose mass of catalytic metal to a temperature over 300° C. approximately, introducing vapor of a crude titanium tetrachloride to contact with said metal, said chloride comprising a minor amount of metal oxychloride, causing a reaction to convert a substantial part of the oxychloride to substances which are less volatile than titanium tetrachloride, removing such substances in condensed state from the titanium tetrachloride in fluid state, and recovering thus purified titanium tetrachloride.

6 Claims, 1 Drawing Sheet

U.S. Patent  Aug. 9, 1988  4,762,696
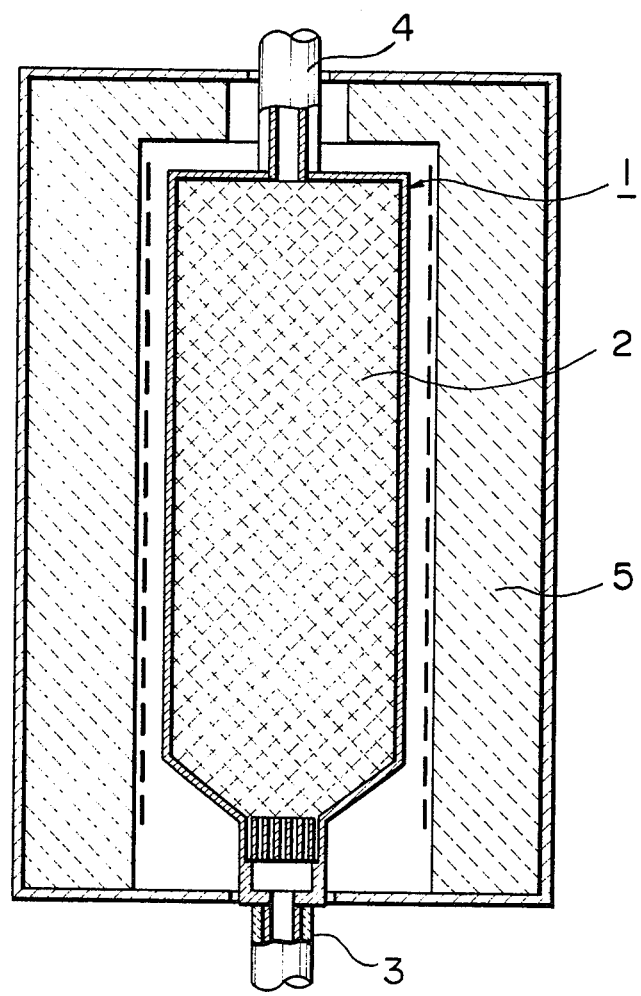

METHOD OF PURIFICATING TITANIUM TETRACHLORIDE

This application is a continuation of application Ser. No. 745,029, filed June 17, 1985, now abandoned.

The present invention relates to a method of purifying titanium tetrachloride ($TiCl_4$) and, in particular, to a method of obtaining such chloride which can yield a low oxygen titanium metal when reduced with magnesium or sodium in the subsequent process.

Titanium metal is produced on a commercial scale, widely by a process in which titanium tetrachloride is reduced with magnesium or sodium. As this process is not effective to remove oxygen impurity, in order to produce a low oxygen metal, it is essential that the chloride itself should contain a very limited amount of impurity such as oxides or other oxygen compounds.

Titanium tetrachloride is generally produced by chlorinating a rutile, whether natural or synthesized from ilumenite by removing the iron component, in the presence of a reductive medium such as coke and, subsequently, separating from the primary product of titanium tetrachloride impurities which are much more volatile or condensable such as $SiCl_4$, $SnCl_4$, $AlCl_3$, $FeCl_3$, $COCl_2$ and $Cl_2$ in a fractional distillation. Exhibiting a boiling point too close to that of $TiCl_4$, $VOCl_3$ as impurity cannot be effectively removed in this process, so the raw chloride is treated in advance with hydrogen sulfide or pulverized copper, thus converting to $VOCl_2$ or $VOCl$ which is much more condensable than titanium tetrachloride. As these treatments are not very effective for elimination of oxychloride impurities such as $TiOCl_2$, thus purified $TiCl_4$ usually exhibits rather a high oxygen level of the order of 0.05 to 0.10% by weight when finally converted to titanium sponge.

A more purified chloride, less contaminated with such oxychlorides, has been desirable for producing a higher quality titanium metal of a lower oxygen level, or for achieving a higher yield of marketable product.

Therefore one of the principal objects of the invention is to provide a method of producing a more oxygen-free titanium tetrachloride which is essential to achieving such commercial advantages.

According to the invention there is provided a method for purifying the tetrachloride, comprising: heating a loose mass of catalytic metal to a temperature over 300° C. approximately, introducing vapor of a crude titanium tetrachloride to contact with said metal, said chloride comprising a minor amount of metal oxychloride, causing a reaction to convert a substantial part of the oxychloride to substances which are less volatile than titanium tetrachloride, removing such substances in condensed state from the titanium tetrachloride in fluid state, and recovering thus purified titanium tetrachloride.

While the method of the invention primarily contemplates the removal of other oxychlorides, it also is effective to decompose the $VOCl_3$ impurity to more readily disposable subcompounds $VOCl_2$ and $VOCl$, so it is not essential any more that the raw chloride be treated with copper or hydrogen sulfide when the former is to be treated by the method of the invention.

Availability as starting material of a $VOCl_3$ containing raw chloride in this method permits not only to save such pre-treatment with copper or hydrogen sulfide, but also to provide a possible index to the level of $VOCl_3$ and other oxygen compounds in the raw chloride during the process of the invention: the titanium tetrachloride develops a yellow-brownish color when contaminated with such impurities and, by the time the chloride looses the color characteristic to $VOCl_3$, the former also becomes free of other contaminants.

The crude vapor to be treated by this invention may be supplied immediately, without effecting any pre-treatment to the vapor, from a fractional distillation process. That allows the overall process plant to take a compact design, although the catalytic metal may have to be replaced or re-generated more frequently.

The catalytic metal of the invention may be selected from copper, iron and copper- and iron based alloys, which are favorable for their high performance considering the availability and economical advantages.

A higher catalyst temperature allows a more efficient decomposition of the oxychlorides, but unfavorably it also results in a higher proportion of $TiCl_2$ and $TiCl_3$ in the yield due to a $TiCl_4$ decomposition which takes place increasingly as the temperature rises. On the balance betweeen the efficiency and yield of the process the temperature range of 400° to 650° C. is found optimal with a catalyst of copper, although it promotes the decomposition of oxychlorides appreciably at temperatures around 300° C., while the range of 600° to 800° C. approximately is optimal with iron, although it promotes the process appreciably about 550° C.

Among possible iron catalysts carbon steel is found most effective with lowest temperatures required for the process, and a higher content of chromium or nickel causes to rise the temperature requirement. In this context, a reaction vessel for the process advantageously should consist of either chromium- or nickel lined steel or stainless steel containing such ingredients, so as to effectively suppress the reaction to proceed on the wall.

The catalyst metal, when consumed by the process in which it is oxidized, can be treated with a stream of hydrogen gas, for example, for re-generation and, finally, replaced entirely with a fresh one.

Oxychlorides for the most part can be converted to less volatile substances and deposit on or around the catalyst metal in liquid or solid phase, which should be removed continuously or at intervals.

The yielding gas is condensed to liquid and then filtered, settled or distilled in order to remove a minor amont of subchlorides $TiCl_2$ and $TiCl_3$, as well as other decomposition products and particulate substances carried in the yield. A titanium tetrachloride thus purified exhibits normally an oxygen level well of the order of 0.03 to 0.01%, for example, with much improvement over the level at 0.05% or more with a corresponding crude by a conventional technique.

Such titanium tetrachloride may be introduced to a reaction vessel loaded of fused magnesium in inert gas atmosphere. The titanium metal thus deposited is heated to elevated temperatures under decreased pressures so as to allow the metal and chloride of magnesium to flow or fly away from the solid product of titanium metal. The latter as thus recovered shows an oxygen content of 0.01% and a hardness around 60 $BHN_{1500Kg}$, an improved quality by far over one of the best quality with the oxygen level at 0.05% and the hardness at 80 $BHN_{1500Kg}$ which the Applicant could achieve with conventionally produced titanium tetrachloride.

Now the invention will be described more in detail by means of examples in reference to the attached drawing. The examples and drawing given herein are for the purpose of illustration only, and should not be taken as limiting the invention.

BRIEF DESCRIPTION OF THE DRAWING

The single drawing is a sectional view of a vessel in which the method of the invention can be conducted.

The sole figure shows in section an arrangement for practising the method of the invention. A closed vertical cylindrical vessel of steel 1 is packed with a mass of divided catalyst metal 2, which may be in the form of powder, turnings, or other loose collection which gives a substantially increased surface relative to the volume. The vessel 1 may be vertical cylindrical for the manufacturability and from the view point of convenience and physical properties. It is cut around to open on the wall and welded together to close. Tubes 3 and 4 are connected to the vessel at the bottom and top, respectively, for feeding crude chloride and exhausting purified chloride. The vessel as a whole is contained in a vertical cylindrical electric furnace which consists of two separable portions and dividable along the axis when it is opened for taking out the vessel.

EXAMPLE 1

A cylindrical vessel as schematically shown in the figure was used, which had a 1 m I.D. and a 3 m length, and which consisted of a chromium nickel stainless steel equivalent to AISI Type 316. The vessel was loaded of 600 Kg of copper foils, heated to temperatures between 500°–550° C., as measured on the vessel wall. Maintaining the temperature condition, vapor of an oxychloride-contaminated titanium tetrachloride was passed through the vessel at a rate of 10 Kg/min. The yielding gas was cooled and condensed to liquid, and settled. A top liquid was filtered to remove solid particles in suspension. The purified $TiCl_4$ exhibited an oxygen level of 250 ppm by weight relative to the metal titanium.

EXAMPLE 2

The reaction vessel was loaded with 500 Kg of turnings of carbon steel and heated to temperatures between 600°–630° C. The crude chloride was fed at 10 Kg/min. The yielding gas was removed of solid particles in suspension. The titanium tetrachloride exhibited an oxygen level of 120ppm.

I claim:

1. A method of purifying titanium tetrachloride, comprising: heating in a vessel a loose mass of catalytic metal to a temperature over 300° C. introducing vapor of a crude titanium tetrachloride to contact with said metal, said chloride comprising a minor amount of titanium oxychloride of formula $TiOCl_2$, causing a reaction to deoxidize and convert a substantial part of the oxychloride to substances which are less volatile than titanium tetrachloride, removing such substances in condensed state from the titanium tetrachloride in fluid state, and recovering thus purified titanium tetrachloride.

2. The method as recited in claim 1 in which said chloride further comprises an oxychloride of formula $VOCl_3$.

3. The method as recited in claim 1, in which said catalytic metal consists essentially of copper.

4. The method as recited in claim 3, in which said temperature is between 400° and 650° C.

5. The method as recited in claim 1, in which said catalytic metal substantially consists of iron, with the temperature being over 550° C.

6. The method as recited in claim 5, in which said temperature is between 600° and 800° C.

* * * * *